US012240111B2

(12) United States Patent  
Maleki et al.

(10) Patent No.: US 12,240,111 B2  
(45) Date of Patent: Mar. 4, 2025

(54) ROBOTIC JOINT ACTUATOR

(71) Applicant: Sanctuary Cognitive Systems Corporation, Vancouver (CA)

(72) Inventors: Hessam Maleki, Burnaby (CA); Seymur Dadashov, Richmond (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 0 days.

(21) Appl. No.: 18/399,632

(22) Filed: Dec. 28, 2023

(65) Prior Publication Data

US 2024/0217096 A1    Jul. 4, 2024

Related U.S. Application Data

(60) Provisional application No. 63/435,893, filed on Dec. 29, 2022.

(51) Int. Cl.
*B25J 13/08* (2006.01)
*B25J 9/10* (2006.01)
*B25J 9/12* (2006.01)

(52) U.S. Cl.
CPC ............. *B25J 9/126* (2013.01); *B25J 9/1025* (2013.01); *B25J 13/088* (2013.01)

(58) Field of Classification Search
CPC .................. B25J 13/088; B25J 9/1025
See application file for complete search history.

(56) References Cited

U.S. PATENT DOCUMENTS

| | | | | |
|---|---|---|---|---|
| 6,258,007 | B1* | 7/2001 | Kristjansson | H02K 11/225 |
| | | | | 477/7 |
| 2016/0305527 | A1* | 10/2016 | Chuo | H02K 7/116 |
| 2019/0222103 | A1* | 7/2019 | Nedrehagen | H02K 16/00 |
| 2021/0006128 | A1* | 1/2021 | Eason | H02K 11/33 |
| 2021/0316451 | A1* | 10/2021 | Kumar | B25J 9/163 |
| 2024/0101219 | A1* | 3/2024 | Ackermann | H02K 21/22 |

* cited by examiner

*Primary Examiner* — William C Joyce  
*Assistant Examiner* — Gregory T Prather  
(74) *Attorney, Agent, or Firm* — Adenike Adebiyi; Thomas Mahon

(57) ABSTRACT

An actuator for a robotic joint includes an actuator housing. A motor is disposed within the actuator housing. The motor includes a stator that is rotationally fixed relative to the actuator housing and a rotor that is rotatable relative to the stator and actuator housing. An output shaft is coupled to a rotational motion of the rotor by a gear reducer. A first rotary encoder is coupled to the rotor to measure one or more parameters of the rotational motion of the rotor. A second rotary encoder is coupled to the output shaft to measure one or more parameters of a rotational motion of the output shaft.

19 Claims, 8 Drawing Sheets

ROBOTIC JOINT ACTUATOR

CROSS-REFERENCE TO RELATED APPLICATIONS

This application claims the benefit of U.S. Provisional Application No. 63/435,893 filed Dec. 29, 2022, the content of which is incorporated herein by reference.

FIELD

The field relates generally to robot operation and control and in particular to actuation of robotic joints.

BACKGROUND

Robots are machines that can sense their environments and perform tasks autonomously. Humanoid robots are robots having an appearance or character resembling that of a human. There is considerable interest in developing humanoid robots that can function as collaborators with humans in diverse applications, such as construction manufacturing, monitoring, exploration, learning, and entertainment. Humanoid robots can be particularly advantageous in substituting for humans in environments that may be dangerous to humans or uninhabitable by humans.

When a humanoid robot is performing a task or interacting with an object or environment, the robot may need to have a certain spatial pose or make a certain humanlike movement or gesture. The structure of the robot can include robotic joints that can be actuated to achieve the desired spatial pose, movement, or gesture. Actuation can take various forms, such as mechanical, electrical, pneumatic, or hydraulic.

SUMMARY

Disclosed herein are examples of an actuator that can provide rotational motion about a single actuation axis, corresponding to one degree of freedom (DOF). The actuator can output a relatively high torque at a relatively low speed without significant backlash and is suitable for forming a single-DOF joint between two robotic segments (e.g., two segments of a robotic torso, or two segments of a robotic arm, or two segments of a robotic leg, or a segment of a robotic torso and a segment of a robotic arm, etc.). A series of actuators can connect a series of robotic segments together to form a robotic component (e.g., a robotic torso, robotic leg, or robotic arm) with multiple degrees of freedom.

In a representative example, an actuator for a robotic joint includes an actuator housing having an axial axis defining an actuation axis. A motor is disposed within the actuator housing. The motor includes a stator rotationally fixed relative to the actuator housing and a rotor rotatable relative to the stator and the actuator housing. The actuator includes an output shaft having an axial axis aligned with the actuator axis. The actuator includes a gear reducer coupling a rotational motion of the rotor to the output shaft. A first rotary encoder is coupled to the rotor and measures at least one parameter of the rotational motion of the rotor. A second rotary encoder is coupled to the output shaft and measures at least one parameter of a rotational motion of the output shaft.

In a second representative example, a robot includes a first robotic member, a second robotic member, and a robotic joint formed between the first robotic member and the second robotic member. The robotic joint includes an actuator housing coupled to the first robotic member. The actuator housing has an axial axis defining an actuation axis. The motor includes a stator rotationally fixed relative to the actuator housing and a rotor rotatable relative to the stator and the actuator housing. The actuator includes an output shaft having an axial axis aligned with the actuator axis. The actuator includes a gear reducer coupling a rotational motion of the rotor to the output shaft. A first rotary encoder is coupled to the rotor and measures at least one parameter of the rotational motion of the rotor. A second rotary encoder is coupled to the output shaft and measures at least one parameter of a rotational motion of the output shaft. The robot includes a first robotic member coupled to the actuator housing. The robot includes a second robotic member coupled to the output shaft.

In a third representative example, a rotary actuator includes an actuator housing having an axial axis defining an actuation axis. A motor is disposed within the actuator housing. The motor includes a stator rotationally fixed relative to the actuator housing and a rotor rotatable relative to the stator and the actuator housing. The actuator includes an output shaft having an axial axis aligned with the actuation axis. The actuator includes a strain wave gear coupling a rotational motion of the rotor to the output shaft. A first rotary encoder is coupled to the rotor and measures at least one parameter of the rotational motion of the rotor. A second rotary encoder is coupled to the output shaft and measures at least one parameter of a rotational motion of the output shaft. The actuator includes a motor drive coupled to the actuator housing and electrically connected to the first rotary encoder, the second rotary encoder, and the motor. The motor drive is positioned radially outward of the actuator housing.

In a fourth representative example, a rotary actuator includes an actuator housing having an axial axis defining an actuation axis. A motor is disposed within the actuator housing. The motor includes a stator and a rotor disposed within a central opening of the stator. The stator is rotationally fixed relative to the actuator housing. The rotor is rotatable relative to the stator and the actuator housing. The actuator includes an output shaft extending axially through a central opening of the rotor and having an axial axis aligned with the actuation axis. The actuator includes a strain wave gear coupling a rotational motion of the rotor to the output shaft. A first rotary encoder is coupled to the rotor and measures at least one parameter of the rotational motion of the rotor. A second rotary encoder is coupled to the output shaft and measures at least one parameter of a rotational motion of the output shaft. The actuator includes a torque sensor coupled to the output shaft. The torque sensor measures torque on the output shaft. The actuator includes a motor drive coupled to the actuator housing and electrically connected to the first rotary encoder, the second rotary encoder, the motor, and the torque sensor.

DETAILED DESCRIPTION

Figure 1:
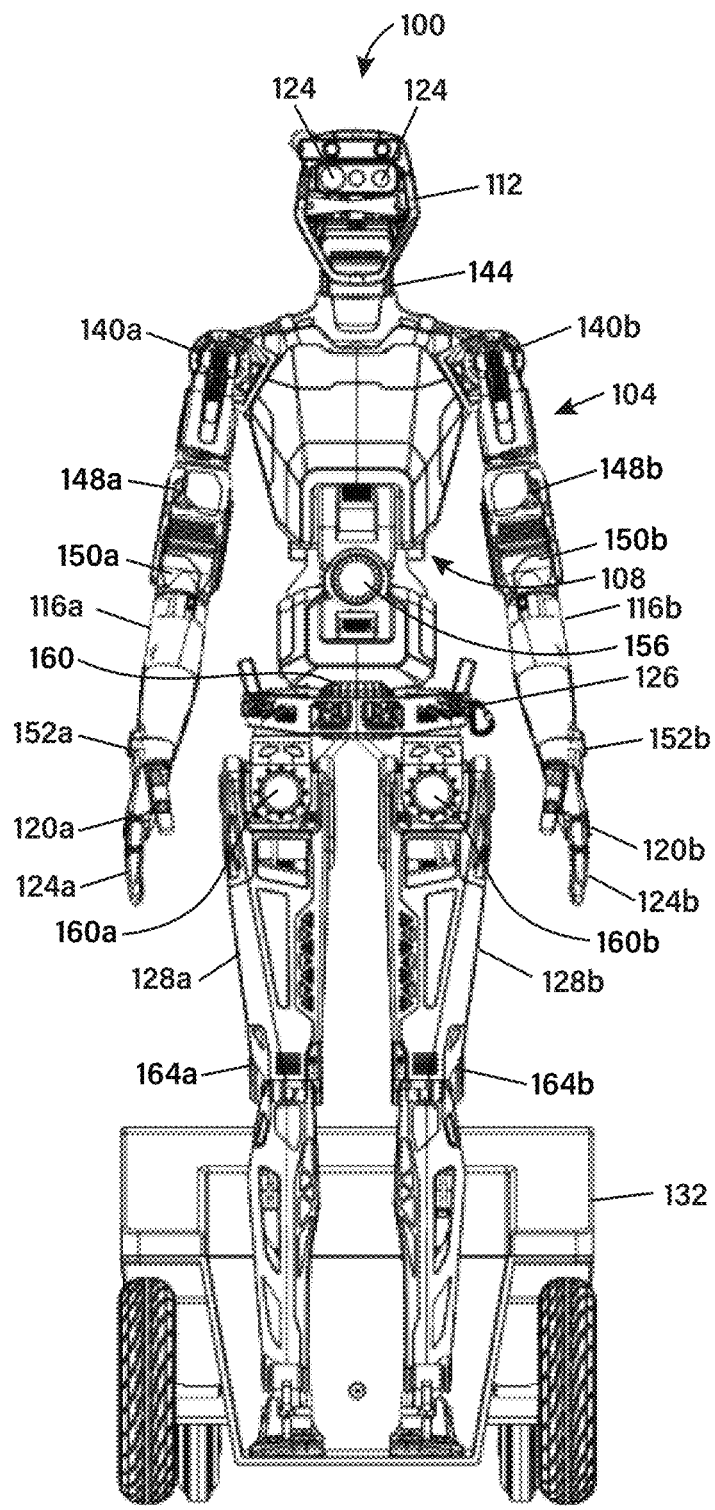
FIG. 1 is a front view of an exemplary robot on a mobile base.

For the purpose of this description, certain specific details are set forth herein in order to provide a thorough understanding of disclosed technology. In some cases, as will be recognized by one skilled in the art, the disclosed technology may be practiced without one or more of these specific details, or may be practiced with other methods, structures, and materials not specifically disclosed herein. In some instances, well-known structures and/or processes associated with robots have been omitted to avoid obscuring novel and non-obvious aspects of the disclosed technology.

All the examples of the disclosed technology described herein and shown in the drawings may be combined without any restrictions to form any number of combinations, unless the context clearly dictates otherwise, such as if the proposed combination involves elements that are incompatible or mutually exclusive. The sequential order of the acts in any process described herein may be rearranged, unless the context clearly dictates otherwise, such as if one act or operation requests the result of another act or operation as input.

In the interest of conciseness, and for the sake of continuity in the description, same or similar reference characters may be used for same or similar elements in different figures, and description of an element in one figure will be deemed to carry over when the element appears in other figures with the same or similar reference character, unless stated otherwise. In some cases, the term "corresponding to" may be used to describe correspondence between elements of different figures. In an example usage, when an element in a first figure is described as corresponding to another element in a second figure, the element in the first figure is deemed to have the characteristics of the other element in the second figure, and vice versa, unless stated otherwise.

The word "comprise" and derivatives thereof, such as "comprises" and "comprising", are to be construed in an open, inclusive sense, that is, as "including, but not limited to". The singular forms "a", "an", "at least one", and "the" include plural referents, unless the context dictates otherwise. The term "and/or", when used between the last two elements of a list of elements, means any one or more of the listed elements. The term "or" is generally employed in its broadest sense, that is, as meaning "and/or", unless the context clearly dictates otherwise. When used to describe a range of dimensions, the phrase "between X and Y" represents a range that includes X and Y. As used herein, an "apparatus" may refer to any individual device, collection of devices, part of a device, or collections of parts of devices.

The term "coupled" without a qualifier generally means physically coupled or lined and does not exclude the presence of intermediate elements between the coupled elements absent specific contrary language. The term "plurality" or "plural" when used together with an element means two or more of the element. Directions and other relative references (e.g., inner and outer, upper and lower, above and below, and left and right) may be used to facilitate discussion of the drawings and principles but are not intended to be limiting.

The headings and Abstract are provided for convenience only and are not intended, and should not be construed, to interpret the scope or meaning of the disclosed technology.

Example I—Overview

Described herein is an actuator that can be used to form joints between rigid members. The actuator can output rotational motion about a single actuation axis, corresponding to one degree of freedom (DOF). An articulated column having multiple DOFs can be constructed using a series of actuators. The actuator can output rotational motion at a relatively high torque and a relatively low speed without significant backlash, which makes the actuator suitable for forming robotic joints (see Example II).

The actuator can have a first actuator structure and a second actuator structure that is rotatable relative to the first actuator structure. A robotic joint between a first robotic segment and a second robotic segment can be formed by coupling the first actuator structure to the first robotic segment and coupling the second actuator structure to the second robotic segment. The actuator can receive controls (e.g., from a motion generation device of the robot or a robot controller) and rotate the second actuator structure according to the controls to move the second robotic segment to a desired position relative to the first robotic segment.

Example II—Example Robot with Robotic Joints

FIG. 1 illustrates an exemplary robot 100 having a humanoid form.

The robot 100 includes a robot body 104 having a robotic torso 108, a robotic head 112, robotic arms 116*a*, 116*b*, and robotic hands 120*a*, 120*b*. The robotic head 112 can include one or more vision sensors 124, which the robot 100 can use to collect information from its environment. The robotic arms 116*a*, 116*b* are coupled to opposite sides of the robotic torso 108. The robotic hands 120*a*, 120*b* (or end effectors) are coupled to the free ends of the robotic arms 120*a*, 120*b*. The robotic hands 120*a*, 120*b* can include one or more digits 124*a*, 124*b* (or articulable members), which the robot 100 can use to interact with objects in the environment or to make gestures.

The robot 104 can include one or more robotic legs. In the illustrated example, the robot 104 includes robotic legs 128*a*, 128*b*, which are coupled to the robotic torso 108 by a robotic hip 126. In the illustrated example, the robotic legs 128*a*, 128*b* are attached to a mobile base 132 (e.g., a wheeled base). In some examples, the robot 100 can be bipedal (e.g., the robot 100 can walk with the robotic legs 128*a*, 128*b*). In other examples, the robot 100 may not have any robotic legs and can still be considered to have a humanoid form. In these other examples, the robotic torso 108 can include a base mounted on a pedestal, which can be attached to a mobile base.

The robot 100 can include several robotic joints. For example, the robot 100 can include shoulder joints 140*a*, 140*b* between the robotic arms 116*a*, 116*b* and the robotic torso 108. A neck joint 144 can be formed between the robotic head 112 and the robotic torso 108. The robotic arms 116*a*, 116*b* can include elbow joints 148*a*, 150*a*, 148*b*, 150*b*. Wrist joints 152*a*, 152*b* can be formed between the robotic arms 116*a*, 116*b* and the robotic hands 120*a*, 120*b*. The robotic torso 108 can include one or more robotic joints, such as a robotic joint 156 that allows flexion-extension of the torso and a robotic joint 160 that allows rotation of the robotic torso 108. The robotic joint 160 can couple the robotic torso 108 to the robotic hip 126. Hip joints 160*a*, 160*b* can be formed between the robotic hip 126 and the robotic legs 128*a*, 128*b*. The robotic legs 128*a* 128*b* can include one or more robotic joints, such as robotic joints 164*a*, 164*b* that allow bending of the robotic legs.

The robotic joints in the robot 100 can be constructed using the actuators described herein. In some examples, the actuators can be controlled to arrange the robot in a particular spatial pose or to cause the robot to make a humanlike movement or gesture.

Example III—Example Actuator

Figure 2A:
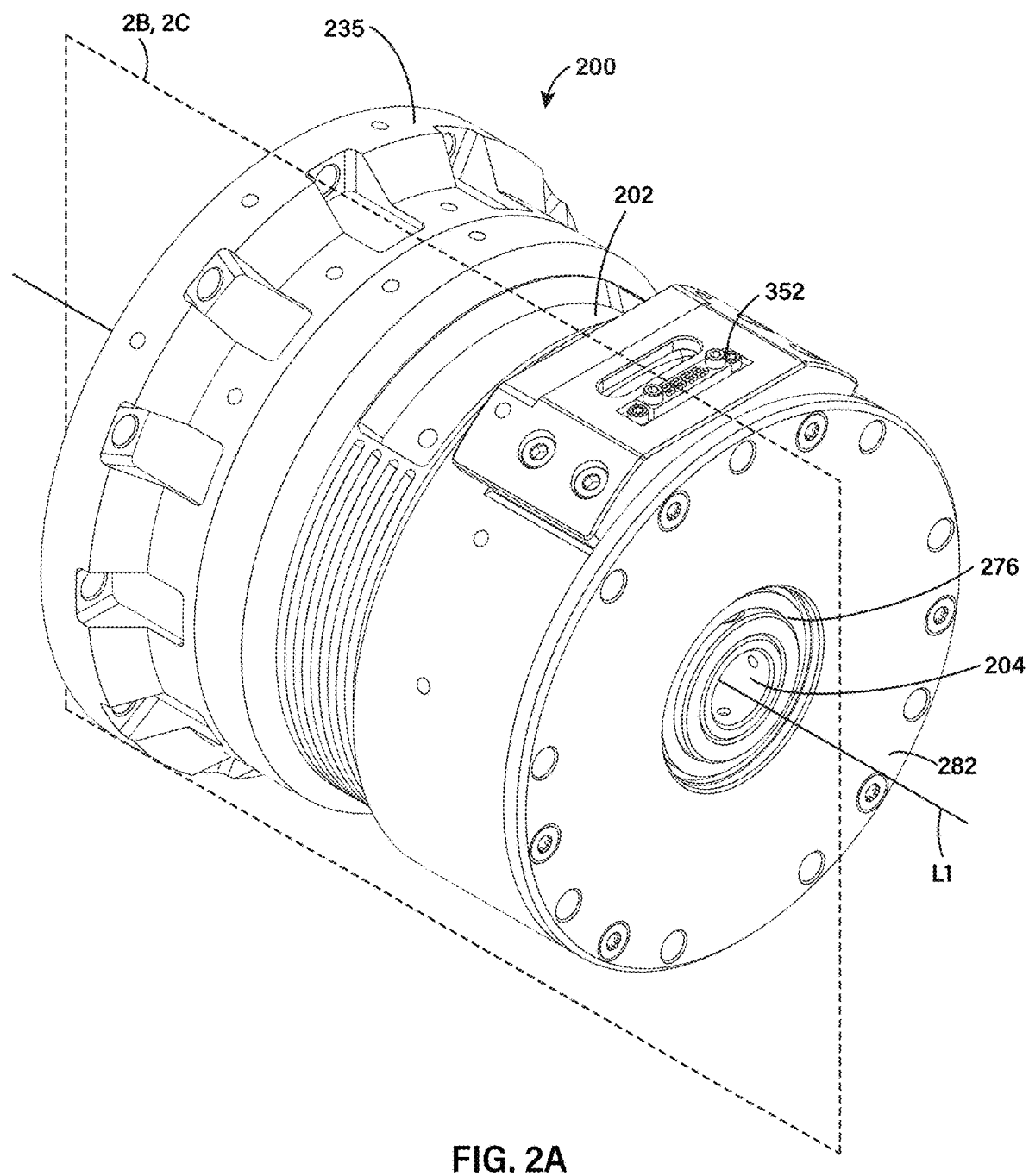
FIG. 2A is a perspective view of an exemplary actuator.
Figure 2B:
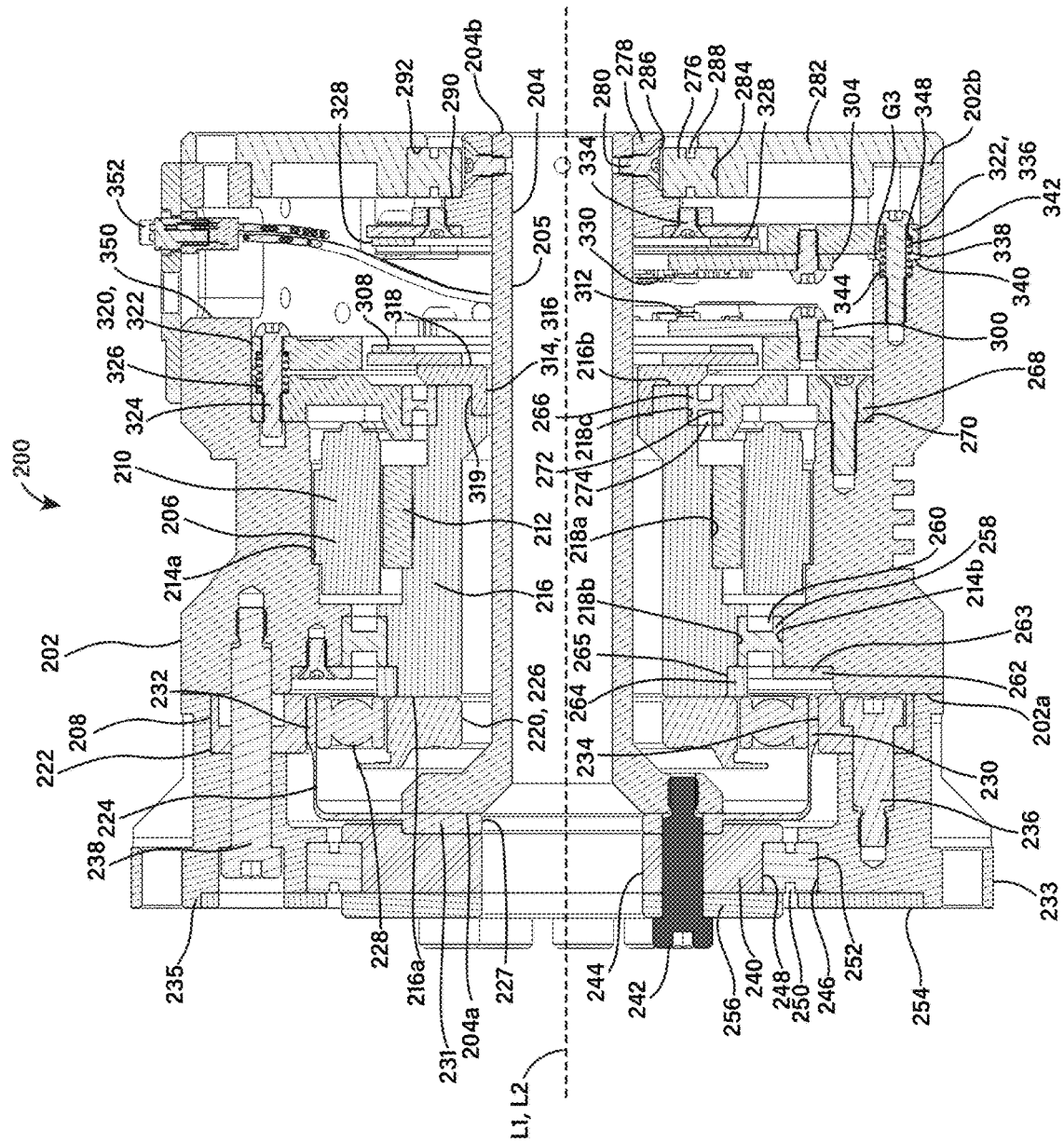
FIG. 2B is a cross-sectional view of the actuator of FIG. 2A along plane 2B as shown in FIG. 2A.
Figure 2C:
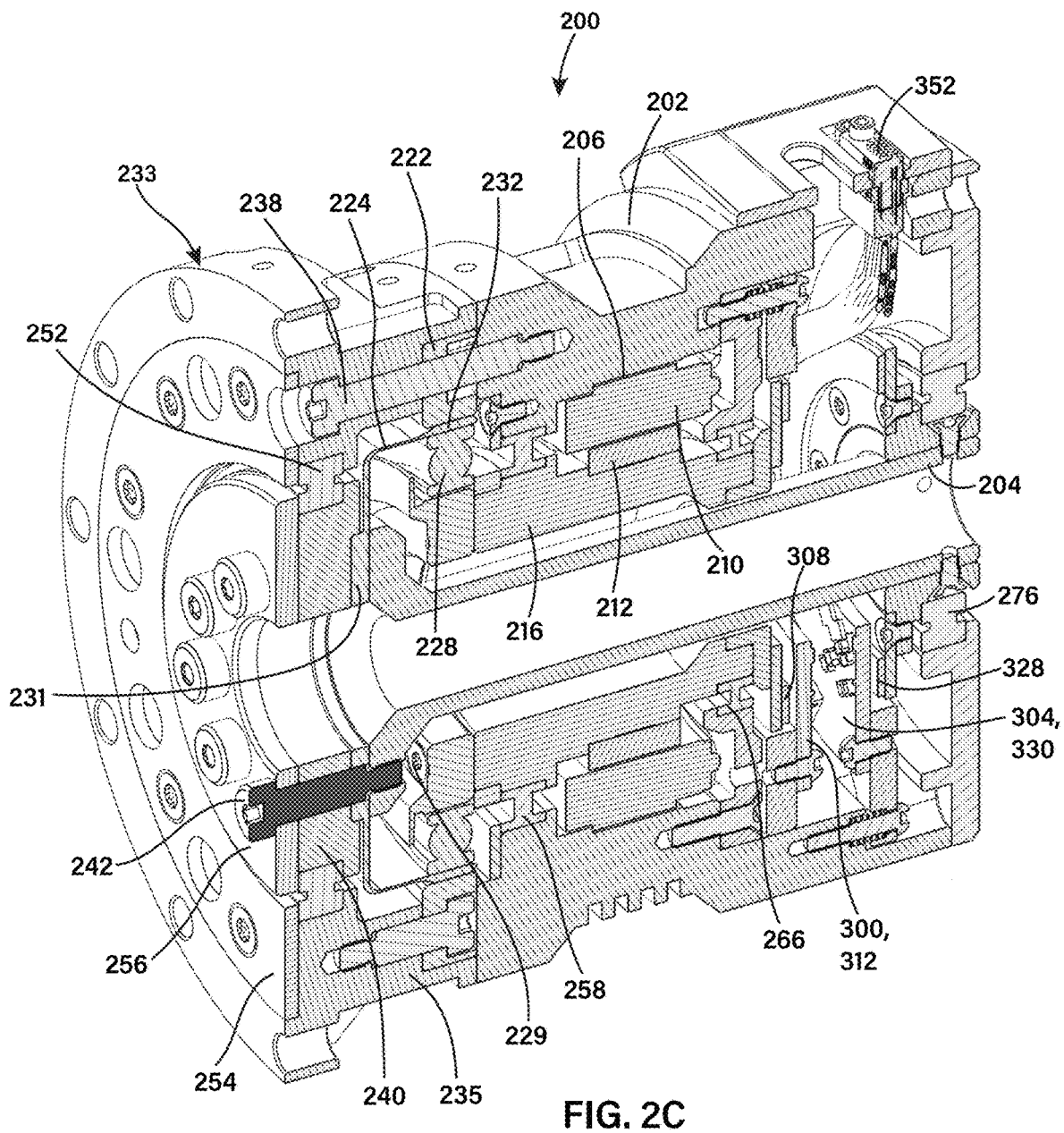
FIG. 2C is a cutaway view of the actuator of FIG. 2A along plane 2C as shown in FIG. 2A.

FIGS. 2A-2C illustrate an exemplary actuator 200 that can be used to form a robotic joint (see robotic joints in Example II).

The actuator 200 includes an actuator housing 202 and an actuation axis L1 (which can be an axial axis of the actuator housing 202). A motor 206 is disposed within a central opening of the actuator housing 202. In some examples, the motor 206 can be a servo motor (e.g., a frameless servo motor). In other examples, the motor 206 can be a different type of motor, such as a stepper motor. The motor 206 can include a stator 210 and a rotor 212. In some examples, electrical current can flow through the windings of the stator 210 to create a rotating magnetic field that causes the rotor 212 to rotate relative to the stator 210 and about a rotor axial axis L2.

In some examples, the stator 210 is disposed adjacent to a recessed inner wall portion 214*a* of the actuator housing 202 and fixedly coupled to the actuator housing 202 (e.g., by attaching the stator 210 to the inner wall portion 214*a* of the actuator housing 202). In some examples, the stator 210 is hollow, and the rotor 212 is disposed within a central opening of the stator 210. In some examples, the rotor 212 is hollow.

The actuator 200 includes an output shaft 204 extending axially through the central opening of the actuator housing 202. In the illustrated example, the output shaft 204 is axially aligned with the actuation axis L1 and coupled to the rotor 212 such that rotation of the rotor 212 about the rotor axial axis L2 causes rotation of the output shaft 204 about the actuation axis L1. In some examples, the rotor 212 is hollow, and the output shaft 204 extends axially through a central opening of the rotor 212. In some examples, the rotor 212 and output shaft 204 can be coaxial.

Motors typically have a high output speed (e.g., in the range of 5-10K RPM) and relatively low torque. Fast rotations are not suitable for articulation of robotic joints since the robotic joints may be rotated far too quickly with the low torque. In some examples, the actuator 200 includes a gear reducer 208 that couples the rotational motion of the rotor 212 to the output shaft 204. The gear reducer 208 reduces the output speed of the motor 206 while proportionally increasing the output torque of the motor 206 such that the output shaft 204 can be rotated with a relatively high torque and a relatively slow speed. In some examples, the gear reducer 208 can include a strain wave gear (e.g., Harmonic Drive® strain wave gear), which can achieve a high gear reduction ratio with zero backlash in a small volume.

In some examples, the actuator 200 can include an input shaft 216 that couples the rotor 212 to the gear reducer 208. In the illustrated example, the input shaft 216 extends axially through the central opening of the rotor 212 and is axially aligned with the rotor 212. The rotor 212 is fixedly coupled to the input shaft 212 (e.g., by attaching the rotor 212 to a recessed outer wall portion 218*a* of the input shaft 216) such that rotation of the rotor 212 about the rotor axial axis L2 causes rotation of the input shaft 216 about the rotor axial axis L2.

In the illustrated example, the input shaft 216 is a hollow shaft, and the output shaft 204 extends through a central opening of the input shaft 216 such that the input shaft 216 is disposed between the output shaft 204 and the rotor 212. In some examples, the rotor 212, input shaft 216, and the output shaft 204 can be coaxial or concentric. The output shaft 204 can be a hollow shaft having a central opening 205 that can allow line structures (e.g., cables, hydraulic lines, and pneumatic lines) to extend through the actuator.

In the illustrated example, the gear reducer 208 can be a strain wave gear including a wave generator 220, a circular spline 222 (or outer gear member), and a flexible spline 224 (or inner gear member). The wave generator 220 can include a hub 226 having an elliptical shape and a bearing 228 (e.g., a ball bearing) fitted on the hub 226. The hub 226 can be coupled to the input shaft 216 such that the rotational motion of the rotor 212 can be transferred to the wave generator 220. The flexible spline 224 has a cylindrical cup shape and is made of a flexible but torsionally-stiff material. An open end portion 230 of the flexible spline 224 is fitted over the bearing 228 and takes on the elliptical shape of the wave generator 220. An external surface 232 of the open end portion 230 includes a set of external teeth.

The circular spline 222 is a rigid ring having an inner surface 234 including a set of internal teeth. The set of internal teeth on the inner surface 234 of the circular spline 222 has a few more teeth (e.g., two more teeth) than the set of external teeth on the external surface 232 of the open end portion 230 of the flexible spline 224. The flexible spline 224 and wave generator 220 are inserted inside the circular spline 222 such that the set of external teeth on the flexible spline 224 can mesh with the set of internal teeth on the circular spline 222.

As the wave generator 220 rotates (e.g., by rotation of the input shaft 216), the wave generates a wave motion that radially deforms the open end portion 230 of the flexible spline 224. The radial deformation of the flexible spline 224 forces the external teeth of the flexible spline 224 into the internal teeth of the circular spline 222 at two opposed regions corresponding to major axis of the elliptical shape of the flexible spline 224.

As the wave generator 220 rotates, the external teeth of the flexible spline 224 that are meshed with the internal teeth of the circular spline 222 change position. Since the flexible spline 224 has fewer teeth than the circular spline 222, the flexible spline 224 rotates backwards by a small amount dictated by the number of fewer teeth for every full rotation of the wave generator 220, which results in a slower rotation of the flexible spline 224 compared to the rotor 212. The flexible spline 224 can be coupled to the output shaft 204 such that rotation of the flexible spline 224 causes rotation of the output shaft 204 at a relatively slower speed and higher torque.

In the illustrated example, the hub 226 of the wave generator 220 is positioned adjacent to a first end 216*a* of the input shaft 216 and attached to the input shaft 216 (e.g., using fasteners 229 (see FIG. 2C) that extend through corresponding holes in the hub 226 and the first end 216*a* of the input shaft 216). In the example, the hub 226 is circumferentially disposed about and radially spaced from the output shaft 204. The circular spline 222 is positioned adjacent to a first end 202*a* of the actuator housing 202 and attached to the actuator housing 202 (e.g., using fasteners 238). A closed end portion 231 of the flexible spline 224 can be disposed over and coupled to a first end 204a of the output shaft 204. In this manner, rotation of the flexible spline 224 can cause rotation of the output shaft 204. The closed end portion 231 of the flexible spline 224 can include a central opening 227 that is connected to the central opening 205 of the output shaft 204.

A bearing assembly 233 can be configured to support rotation of the output shaft 204 near the first end 204a of the output shaft 204. In the illustrated example, the bearing assembly 233 can include a bearing housing 235 mounted on the first end 202a of the actuator housing 202 and disposed circumferentially around the strain wave gear/gear reducer 208 and an end portion of the output shaft 204 including the first end 204a. In the example, the circular spline 222 is attached to the bearing housing 235 (e.g., by fastener(s) 236 extending through corresponding holes in the circular spline 222 and bearing housing 235). The bearing housing 235 is attached to the actuator housing 202 (e.g., by fastener(s) 238) extending through corresponding openings in the bearing housing 235, circular spline 222, and actuator housing 202). In this manner, the bearing housing 235 and the circular spline 222 are fixedly coupled to the actuator housing 202.

The bearing assembly 233 can include a bearing support 240 mounted on the closed end portion 231 of the flexible spline 224. The bearing support 240 can be attached to the closed end portion 231 and the output shaft 204 (e.g., using fastener(s) 242 that extend through corresponding holes in the bearing support 240, closed end portion 231 of the flexible spline 224, and an end portion of the output shaft 204 including the first end 204a). The bearing support 240 can include a central opening 244 that is connected to the central opening 227 of the closed end portion 231 of the flexible spline 224. The bearing support 240 includes an outer wall portion 248 that is radially inward of and radially spaced from an inner wall portion 246 of the bearing housing 235. The wall portions 246, 248 form an annular groove 250 in which a bearing 252 is mounted.

A cover plate 254 can be mounted in a recess formed at an end of the bearing housing 235 and attached to the bearing housing 235. The cover plate 254 can have an annular shape and extend radially inward over a portion of the bearing 252 to form a radial lip that retains the bearing 252 in the annular groove 250. A cover plate 256 can be mounted on the bearing support 240 and attached to the bearing support 240 (e.g., using fasteners). The cover plate 256 can have an annular shape and extend radially outward over a portion of the bearing 252 to form a radial lip that retains the bearing 252 in the annular groove 250.

A bearing 258 can be arranged to support rotation of the input shaft 216 near the first end 216a of the input shaft 216. In the illustrated example, the actuator housing 202 has an inner wall portion 214b that is in opposing relation to an outer wall portion 218b of the input shaft 216. The wall portions 214b, 218 define an annular groove 260 in which the bearing 258 is mounted. A cover plate 262 can be mounted in a recess 263 formed at an end of the actuator housing 202 and secured in the recess (e.g., using fasteners). The cover plate 262 can have an annular shape and extend radially inward to form a radial lip over an outer portion of the bearing 258. A spacer ring 264 can be mounted in a recess 265 formed at an end of the input shaft 216. The spacer ring 264 can extend between the wave generator 220 and the bottom of the recess 265. The spacer ring 264 can extend radially outward to form a radial lip over an inner portion of the bearing 258. The radial lips formed by the cover plate 262 and spacer ring 264 can retain the bearing 258 in the annular groove 250.

A bearing 266 can be arranged to support rotation of the input shaft 216 near a second end 216b of the input shaft 216. In the illustrated example, a bearing support 268 is attached to an inner shoulder 270 of the actuator housing 202 and extends radially inward towards the input shaft 216. The bearing support 268 includes an inner wall portion 272 that is in opposing relation to an outer wall portion 218c of the input shaft 216. The wall portions 272, 218c define an annular groove 274 in which the bearing 266 is mounted.

A bearing 276 can be arranged to support rotation of the output shaft 204 near a second end 204b of the output shaft 204. In the illustrated example, a flanged collar 278 (or bearing support) is disposed around an end portion of the output shaft 204 including the second end 204b and attached to the output shaft 204 (e.g., using fastener(s) 280). A bearing plate 282 is attached to a second end 202b of the actuator housing 202. The bearing plate 282 extends radially inward towards the output shaft 204. The bearing plate 282 includes an inner wall portion 284 that is in opposing relation to an outer wall portion 286 of a collar portion of the flanged collar 278. The wall portions 284, 286 define an annular groove 288 in which the bearing 276 is mounted. The bearing 276 can be retained in the annular groove 288 by opposed shoulders 290, 292 on the flanged collar 278 and bearing plate 282.

The actuator 200 can include an input rotary encoder 300 positioned to measure one or more parameters of the output rotational motion of the motor 206 (e.g., the speed or rotational position of the rotor 212 of the motor 206). For example, the input encoder 300 can be coupled to the rotor 212. The input rotary encoder 300 can be an incremental encoder or an absolute encoder. In some examples, the input rotary encoder 300 can be a magnetic encoder or an optical encoder. In some examples, the motor 206 can include a Hall effect sensor, which can be used together with the input rotary encoder 300 (e.g., an incremental encoder) to measure one or more parameters of the output rotational motion of the motor 206. In some examples, the input encoder 300 can be disposed around and mounted coaxially with the output shaft 204.

In one example, the input rotary encoder 300 can be an absolute encoder having a magnet 308 (e.g., a permanent magnet) and a sensing circuit 312. The magnet 308 can be coupled to the input shaft 216 (e.g., using a flanged collar 314) so that the magnet 308 can rotate with the input shaft 216. The sensing circuit 312 can be coupled to the actuator housing 202 (e.g., using a spring mount 320) such that the magnet 308 rotates relative to the sensing circuit 312. The sensing circuit 312 includes a magnetic sensor that measures changes in the magnetic field distribution as the magnet 308 rotates. The sensing circuit 312 includes circuitry that can determine the position of the input shaft 216 from the output of the magnetic sensor. The position information acquired by the sensing circuit 312 can be used in control of the motor 206 (e.g., to move a robotic joint to a particular position).

The magnet 308 can be in the form of a ring and can be attached to a flange portion 318 of the flanged collar 314 (e.g., using fasteners). (The magnet 308 in the form of a ring can also be referred to herein as an encoder wheel.) The flanged collar 314 can be mounted on the input shaft 216, for example, by fitting a collar portion 316 of the flanged collar 314 in an annular recess 319 formed in an outer wall of the input shaft 216 and by extending the flange portion 318 over the second end 216b of the input shaft 216. The flanged collar 314 can be affixed to the input shaft 216 (e.g., using fasteners). In some examples, the flange portion 318 can extend radially over a portion of the bearing 266 mounted adjacent to the second end 216b of the input shaft 216 and form a radial lip that retains the bearing 266 in the annular groove 274.

The spring mount 320 for the sensing circuit 312 can include a support plate 322 to which the sensing circuit 312 is attached. The support plate 322 can be mounted to the bearing plate 268 using fastener(s) 324 that extend through corresponding holes in the plate 322 and bearing plate 268. In some examples, the spring mount 320 includes springs 326 arranged to bias the support plate 322 away from the bearing plate 268 and thereby isolate the sensing circuit 312 from vibrations in the bearing plate 268. The springs 326 are disposed around the fasteners 324 and between opposed shoulders in the corresponding holes of the support plate 322 and bearing plate 268. The sensing circuit 312 and the support plate 322 can have a ring shape or partial ring shape extending partially or entirely around the output shaft 204. The support plate 322 can be mounted to the bearing plate 268 such that the sensing circuit 312 is parallel to, but axially spaced from, the magnet 308.

The actuator 200 can include an output rotary encoder 304 arranged to measure one or more parameters of the rotational motion of the output shaft 204 (e.g., the speed or rotational position of the output shaft 204). For example, the output rotary encoder 304 can be coupled to the output shaft 204. The output rotary encoder 304 can be an incremental encoder or an absolute encoder. The output rotary encoder 304 can be a magnetic encoder or an optical encoder. In some examples, the output rotary encoder 304 can be disposed around and mounted coaxially with the output shaft 204. In some examples, the output rotary encoder 304 can be mounted in parallel to the input rotary encoder 300.

In the illustrated example, the output rotary encoder 304 can be an absolute encoder having a magnet 328 (e.g., a permanent magnet) and a sensing circuit 330. The magnet 328 can be coupled to the output shaft 204 (e.g., using the flanged collar 278) so that the magnet 328 can rotate with the output shaft 204. The sensing circuit 330 can be coupled to the actuator housing 202 (e.g., using a ring mount 332) such that the magnet 328 rotates relative to the sensing circuit 330. The sensing circuit 330 includes a magnetic sensor that measures changes in the magnetic field distribution as the magnet 328 rotates. The sensing circuit 330 includes circuitry that can determine the position of the output shaft 204 from the output of the magnetic sensor. The position information acquired by the sensing circuit 330 can be used in control of the motor 206 (e.g., to move a robotic joint to a particular position).

The magnet 328 can be in the form of a ring and can be attached to a flange portion of the flanged collar 278 (e.g., using fasteners 334). (The magnet 328 in the form of a ring can also be referred to herein as an encoder wheel.) The ring mount 332 can include a support plate 336 to which the sensing circuit 330 is attached. The support plate 336 can have a ring shape or partial ring shape extending partially or entirely around the output shaft 204. The support plate 336 includes a surface portion 338 in opposing relation to an inner shoulder 340 of the actuator housing 202. The support plate 336 and actuator housing 202 can have corresponding openings 342, 344 extending to the surface portion 338 and inner shoulder 340. The support plate 336 can be coupled to the actuator housing 202 by inserting fasteners 346 into the corresponding holes 342, 344. In some examples, springs 348 are arranged in the corresponding holes 342, 344 and act to bias the surface portion 338 away from the inner shoulder 340 such that the sensing circuit 330 can be isolated from vibrations in the actuator housing 202. The sensing circuit 330 can be parallel to, but axially spaced from, the sensing circuit 312.

In other examples, the input rotary encoder 300 can be an optical encoder including a light source, an encoder wheel having a pattern of transparent and opaque areas, and a sensing circuit including one or more photosensors that can detect light that passes through the encoder wheel. The sensing circuit can generate pulses based on detection of light by the one or more photosensors. The encoder wheel can be coupled to the input shaft 216 so that the movement of the input shaft causes movement of the encoder wheel. The light source and sensing circuit can be coupled to the actuator housing 202 so that they are generally stationary relative to the encoder wheel. Similarly, the output rotary encoder 304 can be an optical encoder, with the encoder wheel coupled to the output shaft 204.

The actuator housing 202 can include a connection port 350. An electrical connector 352 can be mounted within the connection port 350. Wirings can connect the electrical connector 352 to electrical components within the actuator housing 202, such as the encoders 300, 304 and the motor 306.

The actuator housing 202 and the structures connected to the actuator housing 202 form a first actuator structure that can be coupled to a first robotic joint segment. The rotor 212 and the structures connected to the rotor 212 form a second actuator structure that can be coupled to a second robotic joint segment. The position of the first robotic joint segment relative to the second robotic joint segment can be adjusted by rotating the output shaft 204.

Example IV—Example Actuator with Driver and Heat Sink

Figure 3A:
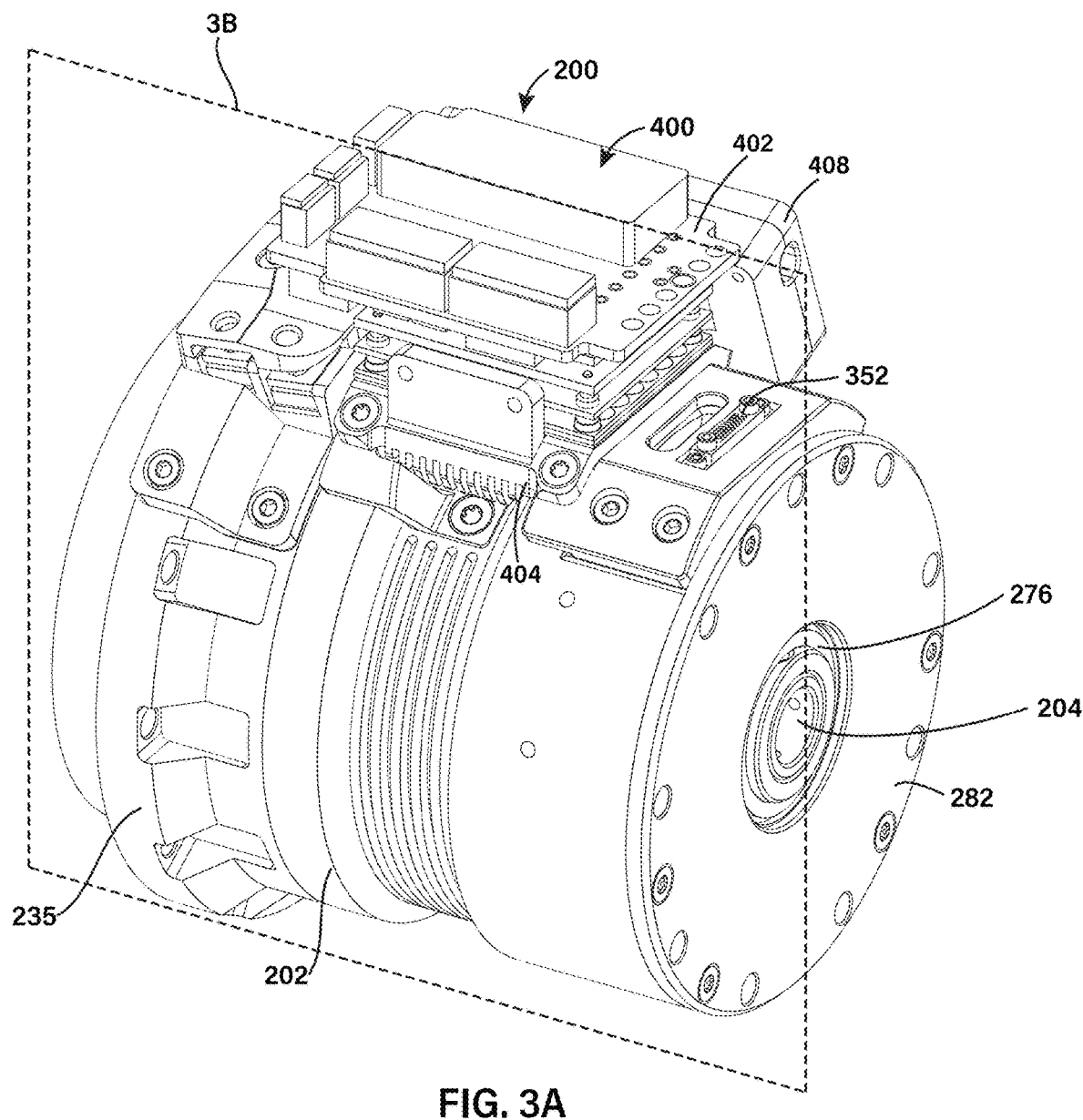
FIG. 3A is a perspective view of an exemplary actuator with a motor drive assembly.
Figure 3B:
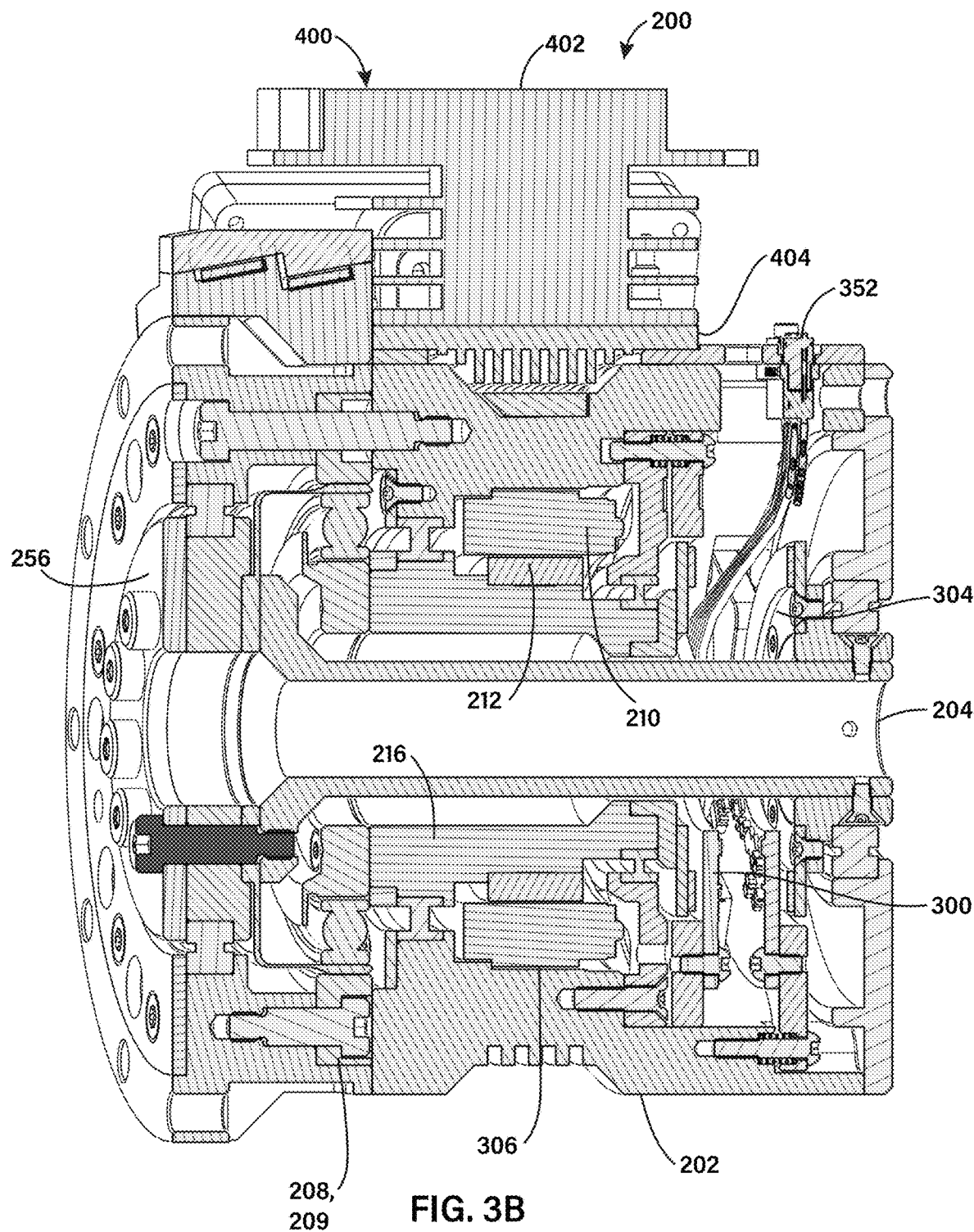
FIG. 3B is a cross-sectional view of the actuator of FIG. 3A along plane 3B as shown in FIG. 3A.

FIGS. 3A-3C illustrates the actuator 200 (see Example III) with a motor drive assembly 400 mounted radially on the actuator housing 202. In some examples, the motor drive assembly 400 can include a motor drive 402 (e.g., a servo drive). The motor drive 402 includes circuitry to form an interface between the electrical components of the actuator 200 and external systems and devices. For example, the motor drive 400 can be connected to the electrical components of the actuator 200 via the electrical connector 352. The motor drive 402 can receive signals from the encoders 300, 304 and use the signals to control operation of the motor 306. In some examples, the motor drive assembly 400 can include other circuit, such as a voltage amplifier 408.

The motor drive assembly 400 can include a heat sink 404 having a fin structure to facilitate removal of heat from the motor drive 402. The motor drive 400 and voltage amplifier 408 can be mounted to the heat sink 404, which can be attached to the actuator housing 202 (e.g., using fasteners).

Example V—Example Actuator with Torque Sensor

Figure 4:
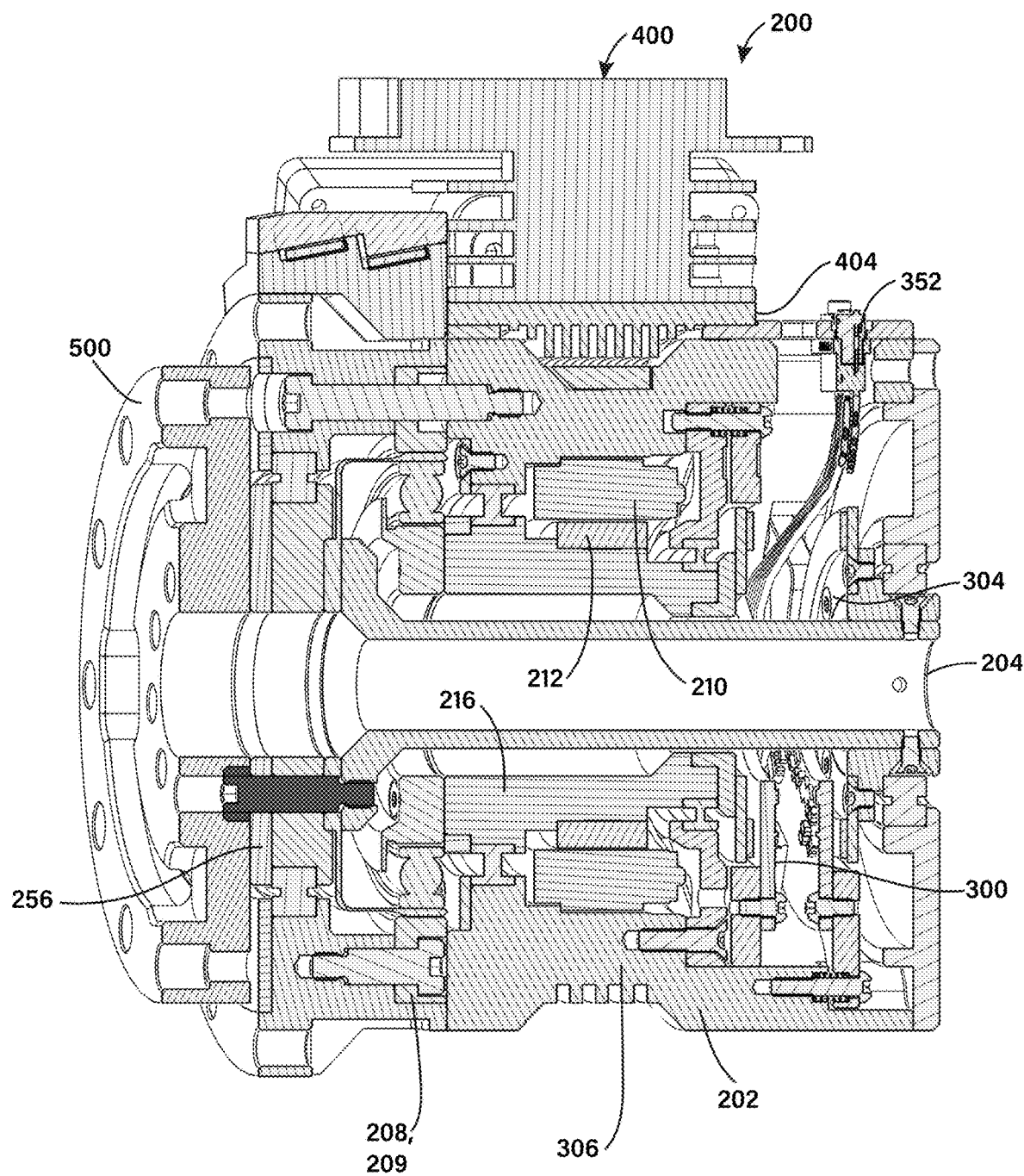
FIG. 4 is a cross-sectional view of an exemplary actuator with a motor drive assembly and torque sensor.

FIG. 4 illustrates the actuator 200 (see Examples III and IV) with a torque sensor 500 mounted axially at an end of the bearing assembly 233. The torque sensor 500 is coupled to the output shaft 204 to measure torque on the output shaft 204. In the illustrated example, the torque sensor 500 (or a torque mount to which a torque sensor is attached) can be attached to the cover plate 256 coupled to the output shaft 204. In this manner, the torque sensor 500 can measure the torque on the output shaft 204 as the output shaft 204 is rotated.

Example VI—Example Robotic Joint Actuation System

Figure 5:
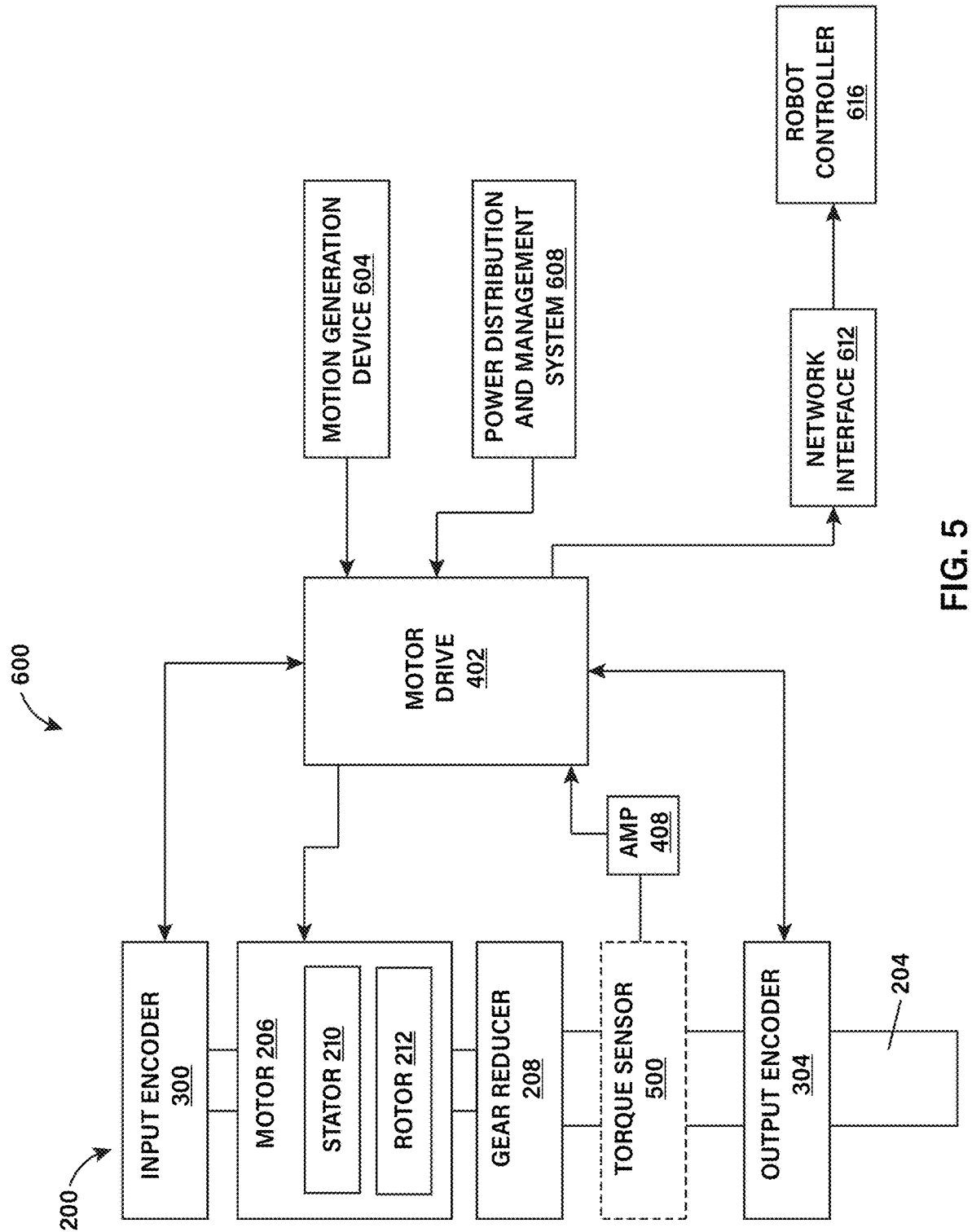
FIG. 5 is a block diagram of an actuation system for a robotic joint.

FIG. 5 illustrates a system 600 including the motor drive 402 connected to the encoders 300, 304, the motor 206, and the torque sensor 500 of the actuator 200. The torque sensor 500 can be connected to the motor drive 402 through the voltage amplifier 408.

The system 600 can include a motion generation device 604 connected to the motor drive 400. The actuator 200 can be integrated in a joint of a robot. During operation of the robot, the motor drive 402 can receive position controls from the motion generation device 604 and translate the position controls into drive controls for the motor drive 400.

The system 600 can include a power distribution and management system 608 connected to the motor drive 400. The power distribution and management system 608 can supply power to the motor drive 400 and the actuator components connected to the motor drive 400.

The system 600 can include a network interface 612 (e.g., EtherCAT Interface) connected to the motor drive 220. The network interface 612 can allow the actuator 200 to communicate with a robot controller 616 or other network devices or systems. For example, the robot controller 616 can receive measurements made by the encoders 300, 304 and torque sensor 500 from the actuator 200 and use the measurements to output controls for the motion generation device 604.

Additional Examples

Additional examples based on principles described herein are enumerated below. Further examples falling within the scope of the subject matter can be configured by, for example, taking one feature of an example in isolation, taking more than one feature of an example in combination, or combining one or more features of one example with one or more features of one or more other examples.

Example 1: An actuator for a robotic joint, the actuator comprising: an actuator housing having an axial axis defining an actuation axis; a motor disposed within the actuator housing, the motor comprising a stator rotationally fixed relative to the actuator housing and a rotor rotatable relative to the stator and the actuator housing; an output shaft having an axial axis aligned with the actuation axis; a gear reducer coupling a rotational motion of the rotor to the output shaft; a first rotary encoder coupled to the rotor, wherein the first rotary encoder measures at least one parameter of the rotational motion of the rotor; and a second rotary encoder coupled to the output shaft, wherein the second encoder measures at least one parameter of a rotational motion of the output shaft.

Example 2: The actuator according to Example 1, wherein the gear reducer comprises a wave generator, a flexible spline, and a circular spline, wherein the flexible spline is fitted on the wave generator and inserted within an opening of the circular spline, and wherein rotation of the wave generator radially displaces the flexible spline to mesh with the circular spline and cause a relative movement between the flexible spline and the circular spline.

Example 3: The actuator according to Example 1 or 2, further comprising an input shaft coupled to the rotor and the wave generator.

Example 4: The actuator of according to Example 3, wherein the output shaft extends through a central opening of the rotor and through a central opening of the input shaft, and wherein the rotor, the input shaft, and the output shaft are coaxial with the actuation axis.

Example 5: The actuator according to Example 4, wherein the first rotary encoder comprises: a first encoder wheel coupled to the input shaft; and a first sensing circuit coupled to the actuator housing and positioned relative to the first encoder wheel to detect changes in a field of the first encoder wheel.

Example 6: The actuator according to Example 5, wherein the sensing circuit is attached to the actuator housing by a spring mount configured to isolate the sensing circuit from vibrations in the actuator housing.

Example 7: The actuator according to Example 5 or 6, wherein the second rotary encoder comprises: a second encoder wheel coupled to the output shaft; and a second sensing circuit coupled to the actuator housing and positioned relative to the second magnet to detect changes in a field of the second encoder wheel.

Example 8: The actuator according to Example 7, wherein the first sensing circuit and the second sensing circuit are radially outward of the output shaft and axially spaced apart in a direction along the actuation axis.

Example 9: The actuator according to any one of Examples 2-8, further comprising: a first bearing assembly coupled to a first end of the actuator housing, the first bearing assembly comprising a first bearing arranged to support rotation of the output shaft proximate the first end of the actuator housing; and a second bearing assembly coupled to a second end of the actuator housing, the second bearing assembly comprising a second bearing arranged to support rotation of the output shaft proximate the second end of the actuator housing.

Example 10: The actuator according to Example 9, wherein the first bearing assembly comprises: a bearing housing coupled to the first end of the actuator housing; a bearing support coupled to a first end of the output shaft and disposed within a central opening of the bearing housing, the bearing support radially spaced from the bearing housing by an annular groove; wherein the first bearing is disposed within the annular groove.

Example 11: The actuator according to Example 10, wherein the circular spline is fixedly coupled to the bearing housing.

Example 12: The actuator according to Example 9 or 10, wherein the second bearing assembly comprises: a bearing plate attached to the second end of the actuator housing; a bearing support disposed on the output shaft and within a central opening of the bearing plate, the bearing support radially spaced from the bearing plate by an annular groove; wherein the second bearing is mounted within the annular groove.

Example 13: The actuator according to any one of Examples 9-12, further comprising a third bearing and a fourth bearing arranged to support rotation of the input shaft at two axially spaced positions.

Example 14: The actuator according to any one of Examples 1-13, further comprising a motor drive coupled to the actuator housing and electrically connected to the first rotary encoder, the second rotary encoder, and the motor, wherein the motor drive is radially outward of the actuator housing.

Example 15: The actuator according to Example 14, further comprising a heat sink mounted on the actuator housing, wherein the motor drive is attached to the heat sink.

Example 16: The actuator according to any one of Examples 1-15, further comprising a torque sensor coupled to the output shaft, wherein the torque sensor measures a torque on the output shaft.

Example 17: The actuator of according to any one of Examples 1-16, wherein the first rotary encoder and the second rotary encoder are absolute encoders.

Example 18: The actuator according to any one of Examples 1-16, wherein the first rotary encoder is an incremental encoder, and further comprising a Hall effect sensor coupled to the rotor.

Example 19: The actuator according to any of Examples 1-18, wherein the motor is a servo motor.

Example 20: A robot comprises: a first robotic member; a second robotic member; a robotic joint formed between the first robotic member and the second robotic member, the robotic joint comprising: an actuator housing coupled to the first robotic member, the actuator housing having an axial axis defining an actuation axis; a motor disposed within the actuator housing, the motor comprising a stator rotationally fixed relative to the actuator housing and a rotor rotatable relative to the stator and the actuator housing; an output shaft having an axial axis aligned with the actuation axis, the output shaft coupled to the second robotic member; a gear reducer coupling a rotational motion of the rotor to the output shaft; a first rotary encoder coupled to the rotor, wherein the first rotary encoder measures at least one parameter of the rotational motion of the rotor; and a second rotary encoder coupled to the output shaft, wherein the second encoder measures at least one parameter of a rotational motion of the output shaft.

Example 21: The robot according to Example 20, wherein the first robotic member comprises a first segment of a humanoid component, and wherein the second robotic member comprises a second segment of the humanoid component.

Example 22: The robot according to Example 20, wherein the first robotic member comprises a segment of a first humanoid component, and wherein the second robotic member comprises a segment of a second humanoid component.

Example 23: A rotary actuator comprising: an actuator housing having an axial axis defining an actuation axis; a motor disposed within the actuator housing, the motor comprising a stator rotationally fixed relative to the actuator housing and a rotor rotatable relative to the stator and the actuator housing; an output shaft having an axial axis aligned with the actuation axis; a strain wave gear coupling a rotational motion of the rotor to the output shaft; a first rotary encoder coupled to the rotor, wherein the first rotary encoder measures at least one parameter of the rotational motion of the rotor; a second rotary encoder coupled to the output shaft, wherein the second encoder measures at least one parameter of a rotational motion of the output shaft; and a motor drive coupled to the actuator housing and electrically connected to the first rotary encoder, the second rotary encoder, and the motor, wherein the motor drive is positioned radially outward of the actuator housing.

Example 24: An actuator comprising: an actuator housing having an axial axis defining an actuation axis; a motor disposed within the actuator housing, the motor comprising a stator rotationally fixed relative to the actuator housing and a rotor rotatable relative to the stator and the actuator housing; an output shaft having an axial axis aligned with the actuation axis; a strain wave gear coupling a rotational motion of the rotor to the output shaft; a first rotary encoder coupled to the rotor, wherein the first rotary encoder measures at least one parameter of the rotational motion of the rotor; a second rotary encoder coupled to the output shaft, wherein the second encoder measures at least one parameter of a rotational motion of the output shaft; a torque sensor coupled to the output shaft, wherein the torque sensor measures torque on the output shaft; and a motor drive coupled to the actuator housing and electrically connected to the first rotary encoder, the second rotary encoder, the motor, and the torque sensor.

The invention claimed is:

1. An actuator for a robotic joint, the actuator comprising:
an actuator housing having an axial axis defining an actuation axis;
a motor disposed within the actuator housing, the motor comprising a stator rotationally fixed relative to the actuator housing and a rotor rotatable relative to the stator and the actuator housing;
an input shaft coupled to the rotor:
an output shaft having an axial axis aligned with the actuation axis;
a gear reducer coupled to the input shaft and the output shaft, the gear reducer coupling a rotational motion of the rotor to the output shaft;
a first rotary encoder coupled to the rotor, wherein the first rotary encoder measures at least one parameter of the rotational motion of the rotor, wherein the first rotary encoder comprises a first encoder wheel coupled to the input shaft and a first sensing circuit coupled to the actuator housing and positioned relative to the first encoder wheel to detect changes in a field of the first encoder wheel, and wherein the sensing circuit is attached to the actuator housing by a spring mount configured to isolate the sensing circuit from vibrations in the actuator housing; and
a second rotary encoder coupled to the output shaft, wherein the second encoder measures at least one parameter of a rotational motion of the output shaft.

2. The actuator of claim 1, wherein the gear reducer comprises a wave generator, a flexible spline, and a circular spline, wherein the flexible spline is fitted on the wave generator and inserted within an opening of the circular spline, and wherein rotation of the wave generator radially displaces the flexible spline to mesh with the circular spline and cause a relative movement between the flexible spline and the circular spline.

3. The actuator of claim 2, wherein the input shaft is coupled to the rotor and the wave generator, and wherein the flexible spline is coupled to the output shaft.

4. The actuator of claim 3, wherein the output shaft extends through a central opening of the rotor and through a central opening of the input shaft, and wherein the rotor, the input shaft, and the output shaft are coaxial with the actuation axis.

5. The actuator of claim 2, further comprising:
a first bearing assembly coupled to a first end of the actuator housing, the first bearing assembly comprising a first bearing arranged to support rotation of the output shaft proximate the first end of the actuator housing; and a second bearing assembly coupled to a second end of the actuator housing, the second bearing assembly comprising a second bearing arranged to support rotation of the output shaft proximate a second end of the actuator housing.

6. The actuator of claim 5, wherein the first bearing assembly comprises:
a bearing housing coupled to the first end of the actuator housing;
a bearing support coupled to a first end of the output shaft and disposed within a central opening of the bearing housing, the bearing support radially spaced from the bearing housing by an annular groove;
wherein the first bearing is disposed within the annular groove.

7. The actuator of claim 6, wherein the circular spline is fixedly coupled to the bearing housing.

8. The actuator of claim 5, wherein the second bearing assembly comprises:
a bearing plate attached to the second end of the actuator housing;
a bearing support disposed on the output shaft and within a central opening of the bearing plate, the bearing support radially spaced from the bearing plate by an annular groove;
wherein the second bearing is mounted within the annular groove.

9. The actuator of claim 5, further comprising a third bearing and a fourth bearing arranged to support rotation of the input shaft at two axially spaced positions.

10. The actuator of claim 1, further comprising a motor drive coupled to the actuator housing and electrically connected to the first rotary encoder, the second rotary encoder, and the motor, wherein the motor drive is radially outward of the actuator housing.

11. The actuator of claim 10, further comprising a heat sink mounted on the actuator housing, wherein the motor drive is attached to the heat sink.

12. The actuator of claim 1, further comprising a torque sensor coupled to the output shaft, wherein the torque sensor measures a torque on the output shaft.

13. The actuator of claim 1, wherein the first rotary encoder and the second rotary encoder are absolute encoders.

14. The actuator of claim 1, wherein the first rotary encoder is an incremental encoder, and further comprising a Hall effect sensor coupled to the rotor.

15. The actuator of claim 1, wherein the motor is a servo motor.

16. An actuator for a robotic joint, the actuator comprising:
an actuator housing having an axial axis defining an actuation axis;
a motor disposed within the actuator housing, the motor comprising a stator rotationally fixed relative to the actuator housing and a rotor rotatable relative to the stator and the actuator housing;
an output shaft having an axial axis aligned with the actuation axis;
a gear reducer coupling a rotational motion of the rotor to the output shaft, the gear reducer comprising a wave generator, a flexible spline, and a circular spline, wherein the flexible spline is fitted on the wave generator and inserted within an opening of the circular spline, and wherein rotation of the wave generator radially displaces the flexible spline to mesh with the circular spline and cause a relative movement between the flexible spline and the circular spline;
an input shaft coupled to the rotor and the wave generator;
a first rotary encoder coupled to the rotor, the first rotary encoder comprising a first encoder wheel coupled to the input shaft and a first sensing circuit coupled to the actuator housing and positioned relative to the first encoder wheel to detect changes in a field of the first encoder wheel, wherein the first rotary encoder measures at least one parameter of the rotational motion of the rotor, wherein the sensing circuit is attached to the actuator housing by a spring mount configured to isolate the sensing circuit from vibrations in the actuator housing; and
a second rotary encoder coupled to the output shaft, wherein the second encoder measures at least one parameter of a rotational motion of the output shaft.

17. The actuator of claim 16, wherein the second rotary encoder comprises:
a second encoder wheel coupled to the output shaft; and
a second sensing circuit coupled to the actuator housing and positioned relative to the second magnet to detect changes in a field of the second encoder wheel.

18. The actuator of claim 17, wherein the first sensing circuit and the second sensing circuit are radially outward of the output shaft and axially spaced apart in a direction along the actuation axis.

19. A rotary actuator comprising:
an actuator housing having an axial axis defining an actuation axis;
a motor disposed within the actuator housing, the motor comprising a stator rotationally fixed relative to the actuator housing and a rotor rotatable relative to the stator and the actuator housing;
an input shaft coupled to the rotor;
an output shaft having an axial axis aligned with the actuation axis;
a strain wave gear having a wave generator coupled to the input shaft and a flexible spline coupled to the output shaft, the strain wave gear coupling a rotational motion of the rotor to the output shaft;
a first rotary encoder coupled to the rotor, wherein the first rotary encoder measures at least one parameter of the rotational motion of the rotor, wherein the first rotary encoder comprises a first encoder wheel coupled to the input shaft and a first sensing circuit coupled to the actuator housing and positioned relative to the first encoder wheel to detect changes in a field of the first encoder wheel, and wherein the sensing circuit is attached to the actuator housing by a spring mount configured to isolate the sensing circuit from vibrations in the actuator housing;
a second rotary encoder coupled to the output shaft, wherein the second encoder measures at least one parameter of a rotational motion of the output shaft; and
a motor drive coupled to the actuator housing and electrically connected to the first rotary encoder, the second rotary encoder, and the motor, wherein the motor drive is positioned radially outward of the actuator housing.

* * * * *